(12) United States Patent
Frenkler et al.

(10) Patent No.: US 10,688,767 B2
(45) Date of Patent: Jun. 23, 2020

(54) METHOD FOR MANUFACTURING A PUNCHED COMPONENT AND PUNCHED COMPONENT PRODUCED THEREBY

(71) Applicants: CCL DESIGN GMBH, Solingen (DE); Thorsten Frenkler, Sprockhövel (DE)

(72) Inventors: Dieter Frenkler, Schwelm (DE); Peter Fleissner, Alzey (DE)

(73) Assignee: CCL Design GmbH, Solingen (DE)

( * ) Notice: Subject to any disclaimer, the term of this patent is extended or adjusted under 35 U.S.C. 154(b) by 96 days.

(21) Appl. No.: 15/572,026

(22) PCT Filed: May 6, 2016

(86) PCT No.: PCT/EP2016/060239
§ 371 (c)(1),
(2) Date: Nov. 6, 2017

(87) PCT Pub. No.: WO2016/177904
PCT Pub. Date: Nov. 10, 2016

(65) Prior Publication Data
US 2018/0141323 A1    May 24, 2018

(30) Foreign Application Priority Data
May 6, 2015   (DE) .................. 10 2015 107 032

(51) Int. Cl.
*B32B 38/00*         (2006.01)
*B32B 15/00*         (2006.01)
(Continued)

(52) U.S. Cl.
CPC .............. *B32B 38/04* (2013.01); *B32B 15/00* (2013.01); *B32B 15/08* (2013.01); *B32B 37/12* (2013.01);
(Continued)

(58) Field of Classification Search
CPC ......... B32B 38/00; B32B 15/08; B32B 38/06; B32B 38/145; B32B 15/095; B32B 15/082; B32B 5/085; B32B 7/12; B32B 38/04; B32B 2038/042; B32B 2605/08; B32B 27/40; B32B 37/12; B29C 63/04;
(Continued)

(56) References Cited

U.S. PATENT DOCUMENTS 4,456,652 A * 6/1984 Konishi .................. H01B 5/02
                                                   428/344
5,570,501 A * 11/1996 Atkinson ............... F16J 15/122
                                                   156/219
(Continued)

FOREIGN PATENT DOCUMENTS

DE   102009056761 A1   6/2011
JP       406165973  *  6/1994  ............... C23G 5/00
(Continued)

*Primary Examiner* — Linda L Gray
(74) *Attorney, Agent, or Firm* — Berenato & White, LLC

(57) ABSTRACT

The invention relates to a method for manufacturing a punched component comprising the steps: a) laminating a polymer film onto a metal sheet, b) subjecting the metal sheet to a punching process, by means of which the punched component is produced, wherein a polymer film is used which is provided with a cold-flowable pressure-sensitive adhesive.

18 Claims, 3 Drawing Sheets

(51) Int. Cl.
    *B23B 37/00* (2006.01)
    *B32B 38/04* (2006.01)
    *B32B 15/08* (2006.01)
    *B32B 37/12* (2006.01)
    *B32B 38/06* (2006.01)

(52) U.S. Cl.
    CPC ............ *B32B 38/06* (2013.01); *B32B 38/145* (2013.01); *B32B 2038/0048* (2013.01); *B32B 2038/042* (2013.01); *B32B 2605/08* (2013.01)

(58) Field of Classification Search
    CPC ... B29C 70/28; B29C 65/2046; B29C 65/745; Y10T 156/1028; Y10T 156/103; Y10T 156/1054; Y10T 156/1034
    See application file for complete search history.

(56) References Cited

U.S. PATENT DOCUMENTS

| | | | | |
|---|---|---|---|---|
| 5,595,810 | A * | 1/1997 | Beinert | B32B 37/0076 156/219 |
| 8,083,878 | B1 | 12/2011 | Booth et al. | |
| 2003/0208895 | A1* | 11/2003 | Chang | A45D 31/00 29/428 |
| 2011/0027594 | A1* | 2/2011 | Johnson | B32B 15/08 428/425.8 |

FOREIGN PATENT DOCUMENTS

| | | |
|---|---|---|
| WO | WO9625292 A1 | 8/1996 |
| WO | WO2009120547 A2 | 10/2009 |
| WO | WO2014187982 A1 | 11/2014 |

\* cited by examiner

METHOD FOR MANUFACTURING A PUNCHED COMPONENT AND PUNCHED COMPONENT PRODUCED THEREBY

CROSS-REFERENCE TO RELATED APPLICATIONS AND CLAIM TO PRIORITY

This application is a national stage application of International Application No. PCT/EP2016/060239 filed May 6, 2016, which claims priority to German Patent Application No. 10 2015 107 032.4 filed May 6, 2015, the disclosures of which are incorporated herein by reference and to which priority is claimed.

FIELD OF THE INVENTION

The invention relates to a method for manufacturing a punched component comprising the steps: a) laminating a polymer film onto a surface of a metal sheet, b) subjecting the metal sheet to a punching process, by means of which the punched component is produced. Furthermore, the invention relates to a punched component comprising a metal sheet and a polymer film which is laminated onto a surface of the metal sheet, and so is firmly bonded to the metal sheet, the polymer film being designed such that it can be deep drawn.

BACKGROUND OF THE INVENTION

Punched components of the type indicated above and which are provided with a polymer film as a protective layer are used, for example, as entrance sills for motor vehicles. They are subjected to a high degree of wear due to the effects of weather and constant stress. In particular, corrosion may occur on the punched surfaces and in the cross-over regions between the metal sheet, which can be made, for example, of aluminium or also of a Cr—Ni stainless steel, and the polymer film. In particular, crevice corrosion and filiform corrosion often occur.

Methods for manufacturing this type of punched component, which has a surface coating in the form of a polymer film to protect against corrosion, are known, for example, from WO 96/25292. The polymer film is provided here on its upper side with a scratch-resistant layer which serves to protect against corrosion. On the lower side of the polymer film which has the metal sheet a layer of hot melt adhesive is provided which is thermally activated upon laminating the polymer film onto the metal sheet.

The methods known from the prior art for manufacturing a punched component have proven to be of value. However, it is considered to be a disadvantage that cracking occurs during the punching process if the polymer film can not follow the deformations of the metal substrate. In order to prevent cracking, the entire structure of the coatings must follow the deformations of the metal sheet. Until now, one has not been able to totally guarantee this in practice because, for example, small discrepancies in the anchoring of the polymer film may lead to the polymer film being re-set, and so may lead cracking.

In particular when using hot-melt adhesive, the risk of cracking is increased because the punching process takes place at ambient temperature and hot melt adhesive becomes brittle in this temperature range.

Moreover, with a brushed metal surface an increased risk of cracking is observed because the metal surface has a distinct fine structure due to the brushing process. The large number of microscopically small openings between the polymer film and the metal surface are weak points which may lead to cracking with corresponding stressing of the punched edge. This in turn leads to crevice corrosion if a crevice with a width of between 0.02 mm and 0.5 mm forms, and due to lack of oxygen passivation of the metal surface can not take place. Crevice corrosion occurs with almost all metals, including Cr—Ni stainless steels. Moreover, crevice corrosion also occurs with crevices which form between metal and plastic.

With crevice corrosion, due to the high concentration of oxygen a cathodic reaction takes places at the start of the crevice, while at the end of the crevice an anodic reaction that removes metal occurs.

Filiform corrosion is manifested by thread-shaped infiltrations between the coating and the metal surface. With aluminium, this type of corrosion, which corresponds electrochemically to crevice corrosion, is a frequently observed cause of damage.

SUMMARY OF THE INVENTION

On the basis of the prior art, it is an object of the present invention to specify a method for manufacturing a punched component and a punched component of the type specified at the start which make it possible to avoid crevice and filiform corrosion in the punched component.

In a method for manufacturing a punched component of the type specified at the start, this object is achieved by a polymer film being used which is provided with a cold-flowable pressure-sensitive adhesive on its side pointing towards the metal sheet during the lamination process. With a punched component of the type specified at the start, the object is accordingly achieved by the polymer film for producing the firmly bonded connection between the metal sheet and the polymer film being provided with a cold-flowable pressure-sensitive adhesive on its side pointing towards the metal sheet.

According to the invention therefore, the polymer film, in particular a TPU film, is fixed by means of a cold-flowable pressure-sensitive adhesive (PSA) to the metal sheet as a substrate. The cold-flowable pressure-sensitive adhesive has a high degree of flowability at ambient temperature which makes it possible to draw the polymer film with the pressure-sensitive adhesive over the cut side surfaces of the metal sheet during the punching process, the arrangement of the polymer film and the pressure-sensitive adhesive resting against the side surfaces, by means of which optimal sealing of the side surfaces is guaranteed. In addition, due to the transverse forces that occur during the punching process, the pressure-sensitive adhesive is pushed away and passes out between the polymer film and the metal sheet in the region of the side surfaces so that the cross-over region between the polymer film and the metal sheet is sealed. The edge sealing that takes place in this way is very thermally and mechanically resistant. As a result, by using a cold-flowable pressure-sensitive adhesive, cracking between the polymer film and the metal sheet, and so the occurrence of crevice and filiform corrosion are reliably avoided.

Preferably, a polyurethane, in particular thermoplastic polyurethane, which has excellent self-healing and deep drawing capabilities, is used as the polymer film. Alternatively, polyvinyl chloride or polyethylene, for example, can also be used.

A pre-requisite for the polymer film equipped with the cold-flowable pressure-sensitive adhesive being able to close off the cut side surface of the metal sheet is that, in order to carry out the punching process, a stamp and a corresponding die are used which are designed such that there is a gap between the stamp and the die so that the polymer film and the cold-flowable pressure-sensitive adhesive are drawn along the cut side surface of the metal sheet during the punching process before they are transected. The size of the gap is such here that it is smaller than the sum of the layer thicknesses of the polymer film and the pressure-sensitive adhesive.

Generally, the surface of the metal sheet can be brushed and/or smoothed before the lamination in step a). The brushing serves to produce a mat surface of the metal sheet. Likewise, the surface of the metal sheet that is to be laminated must be cleaned. In particular, it is necessary to remove from the surface any oil remaining on the surface after the brushing and/or smoothing.

According to one embodiment of the invention provision is made such that during the cleaning, oil and/or fat is burnt off of the surface, in particular a gaseous fuel being used for the burning, to which fuel silane is added which decomposes during the burning and forms $SiO_2$ particles which are deposited on the surface that is to be cleaned. The burning away of the oil from the surface of the metal sheet generally takes place at a temperature of approximately 2000° C. Since it is difficult to control the burning process, the burning preferably takes place in two stages, in particular in the second burning stage a gaseous fuel to which silane is added being used for the burning. This silane decomposes during the burning, forming $SiO_2$ particles which are deposited on the surface to be cleaned. These deposits in turn form anchoring points which make it possible to print directly onto the metal surface without applying a conversion layer lying in between.

According to one configuration of the present invention provision is made such that after the lamination in step a) and before the punching in step b) the polymer film is heated up. In this way the polymer crystals of the polymer film are melted in order to obtain an amorphous polymer film. In other words, by heating, the crystallinity is reduced, by means of which the polymer film acquires a high degree of permeability so that solvent can penetrate into the polymer film. This results in good anchoring for a subsequent process of printing onto the polymer film.

In order to amorphise the polymer film, the heating can take place at a temperature of between 60° C. and 120° C., preferably at a temperature of between 80° C. and 100° C., particularly preferably at a temperature of 90° C., and for a period of 10 mins to 120 mins, preferably for a period of 20 mins to 60 mins, particularly preferably for a period of 30 mins.

Furthermore, before or simultaneously with the punching process in step b), the metal sheet can be subjected to an embossing process. In this way the metal sheet is reshaped plastically according to the application-specific requirements.

Furthermore, before or after the punching process the polymer film can be subjected to a printing process in order to provide the polymer film with a desired design. Next, the polymer film is coated with a layer of hard material, in particular in the form of a nano paint. If the polymer film is not subjected to a printing process, alternatively a polymer film can be used which is equipped as standard with a layer of hard material. Due to the layer of hard material, light cleaning of the punched component is made possible. Moreover, the polymer film is protected against damage due to scratches etc.

In a way known in its own right, after the punching process in step b) the punched component may be subjected to deep drawing-type re-shaping. Here, the maximum depth of the re-shaping corresponds to 1 to 10 times, preferably 5 to 10 times, particularly preferably 5 to 7 times the thickness of the metal sheet. In this way the punched component is re-shaped according to the application-specific requirements. The maximum depth of the re-shaping is limited here by the deep drawing-capability of the pressure-sensitive adhesive.

The metal sheet may comprise or be made of one or more of the following materials: aluminium, an aluminium alloy, Cr—Ni austenitic steel. Crevice corrosion occurs in many metals, also including Cr—Ni stainless, austenitic steels. Therefore, corrosion protection according to the invention is expedient with these materials.

Furthermore, the polymer film may comprise or be made of one or more of the following materials: polyvinyl chloride, polyethylene, polyurethane, in particular thermoplastic polyurethane. These materials are suitable due to their mechanical properties such as deformation when subjected to tensile stress, resilience (self-healing), maximum tearing tension, and especially deep drawing capability, as well as their application-specific properties such as good printability, good to very good coating properties and good to very good weathering properties. Moreover, due to their polymer matrix they offer reliable diffusion protection.

The polymer film may have a film thickness of between 1 μm and 500 μm, preferably a film thickness of between 20 μm and 250 μm, particularly preferably a film thickness of between 30 μm and 160 μm. With such film thicknesses very good and reproducible results are achieved.

Generally, the polymer film may have a layer of hard material, in particular in the form of a nano paint. By means of the layer of hard material, which has a low surface tension, light cleaning of the punched component is made possible. Moreover, the polymer film is protected from damage such as scratches etc.

Furthermore, the pressure-sensitive adhesive may comprise or be made of a self-adhesive acrylate formulation, in particular a solvent-based acrylate adhesive.

These pressure-sensitive adhesives are characterised by a high adhesive force and particular shear stability. Moreover, they have very good resistance to salted water.

Furthermore, the pressure-sensitive adhesive may be applied in one layer or in a number of layers over the polymer film. Here the polymer film may have a total amount of 10 $g/m^2$ to 100 $g/m^2$, preferably of 20 $g/m^2$ to 60 $g/m^2$, of pressure-sensitive adhesive. Very good and reproducible results are achieved with this amount of pressure-sensitive adhesive.

The pressure-sensitive adhesive may have a glass transition temperature of between 10° C. and −100° C., preferably a glass transition temperature of between −10° C. and 80° C., particularly preferably a glass transition temperature of between −20° C. and −50° C. Generally, pressure-sensitive adhesives have glass transition temperatures within this temperature range.

BRIEF DESCRIPTION OF THE DRAWINGS

Further features and advantages of the present invention are made clear by means of the following description of an embodiment of a punched component according to the invention with reference to the drawings. These show as follows.

DETAILED DESCRIPTION OF THE PREFERRED EMBODIMENT(S)

Figure 1:
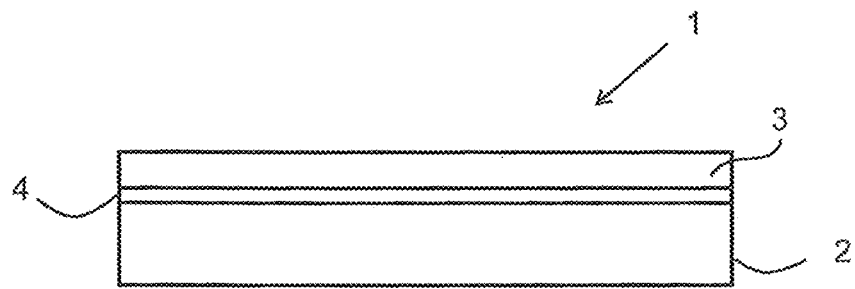
FIG. 1 a schematic cross-sectional view of the layer structure of a punched component according to the present invention, FIG. 2 schematically, the various stages of a punching process for manufacturing the punched component, and FIG. 3 detail A from FIG. 2 in an enlarged illustration.

FIG. 1 shows a punched component 1 according to a first embodiment of the present invention and which is protected against crevice and filiform corrosion, the layer structure of the punched component 1 being shown schematically in cross-section. The punched part 1 comprises a metal sheet 2 which is made of aluminium and has a thickness of 0.7 mm.

The punched component 1 further comprises a self-adhesive polymer film 3 which is applied to the surface of the metal sheet 2 by lamination so that there is a firmly bonded connection to the metal sheet 2. The polymer film 3 is designed such that it can be deep drawn up to 3.5 mm, is made of thermoplastic polyurethane and has a film thickness of 100 μm.

In a manner that is not shown, the polymer film 3 has on its outer surface a layer of hard material (not shown) in the form of a nano paint which has a low surface tension and so enables light cleaning of the punched component 1. The layer of hard material is produced by means of materials that contain solvent which can diffuse 3 μm to 6 μm into the polymer film. Therefore, the layer of hard material does not have any effect upon the deep drawing capability of the polymer film 3.

In order to establish the firmly bonded connection between the metal sheet 2 and the polymer film 3, the polymer film 3 is provided with a cold-flowable pressure-sensitive adhesive 4, or PSA, on its side pointing towards the metal sheet 2. Here the polymer film 3 has an amount of 40 g/m² of pressure-sensitive adhesive. This is applied in one layer over the polymer film, is made of a solvent-based acrylate adhesive 4 and has a glass transition temperature of between −20° C. and −50° C. Due to its high adhesive force, particular shear stability and very good resistance to salted water, solvent-based acrylate adhesive 4 has proven to be of value. In the neutral salt water spray test, a standardised test method for assessing the corrosion protection effect, no changes were determined in this pressure-sensitive adhesive 4 or the polymer film 3 after 500 hours.

With aluminium, filiform corrosion, which corresponds electrochemically to crevice corrosion, is a frequently observed cause of damage. With crevice corrosion, due to the high concentration of oxygen at the start of the crevice, a cathodic reaction occurs, whereas at the end of the crevice an anodic reaction that removes metal takes place. The start of the filiform corrosion often occurs at this point. The filiform corrosion is manifested by thread-shaped infiltrations between the coating and the metal surface. By means of the deep drawing capability of the polymer film 3 and the flowability of the pressure-sensitive adhesive 4 at ambient temperature it is ensured that during the punching process the cut side surfaces of the metal sheet 2 are well covered and sealed, as will be explained further in the following.

This edge sealing has good thermal and mechanical resistance. In addition, small-scale mechanical damage to the polymer film 3 can be eliminated by continued flow (self-healing effect of the TPU film 3). In this way cracking, and so the occurrence of crevice and filiform corrosion, may be reliably avoided. In addition, due to the thickness of the polymer film and of the pressure-sensitive adhesive, the edge sealing is a means of protecting against contact corrosion which occurs with a conductive connection between two differently noble metals in the presence of an electrolyte. Furthermore, the polymer film 3 serves as protection against pitting and selective corrosion by absorbing corrosion-triggering particles. Pitting is triggered, for example, by abrasive dust particles, whereas selective corrosion is triggered by alloy components.

In the manufacture of the punched component 1 the surface of the metal sheet 2 is first of all roughly cleaned. Next the surface of the metal sheet 2 made of aluminium is brushed. The brushing of the surface of the metal sheet 2 takes place by means of rotating, oscillating brushes with a hard strand configuration, and serves to produce a mat surface of the metal sheet 2. Next the oil remaining on the surface of the metal sheet 2 after the brushing is burnt away. The burning takes place in two stages at a temperature of approximately 2000° C. A gas to which silane is added is used here as the fuel for the second stage of the burning, which silane decomposes with the burning, forming $SiO_2$ particles which are deposited on the surface of the metal sheet 2. These $SiO_2$ particles form anchoring points which make it possible to print directly onto the metal sheet, dispensing with a conversion layer.

After cleaning the surface and optionally printing onto the latter, the polymer film 3 provided with the cold-flowable pressure-sensitive adhesive 4 is laminated onto the metal sheet 2.

In order to obtain an amorphous polymer film 3, after lamination the polymer film 3 is heated. The heating takes place at a temperature of 90° C. and for a period of 30 minutes.

Figure 2:
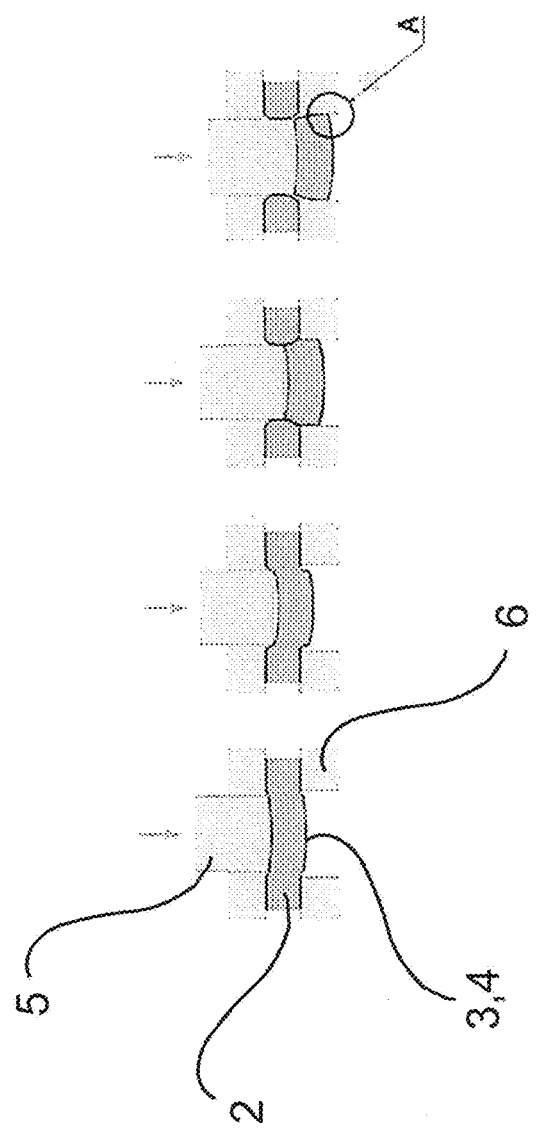
Figure 3:
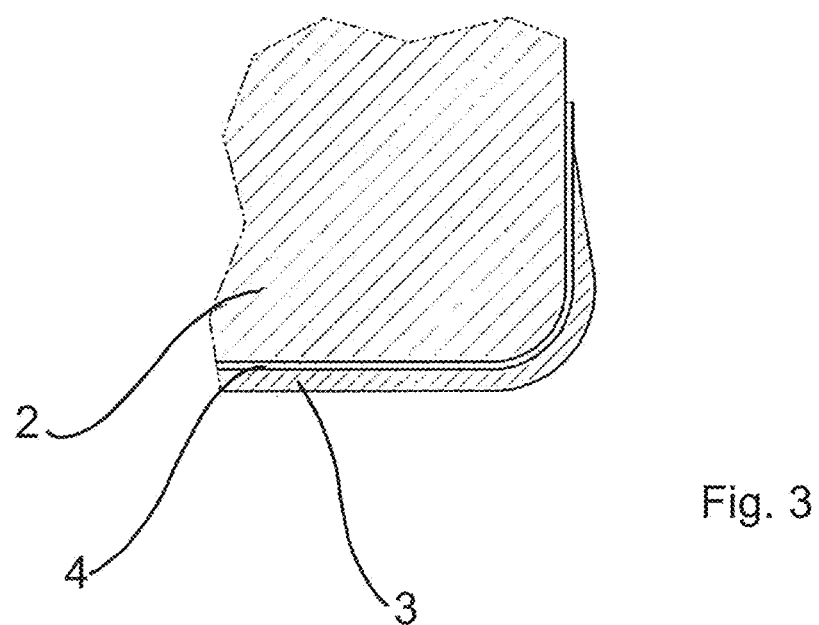

Next the metal sheet 2 is subjected to a punching process at ambient temperature, by means of which the punching component 1 is produced. The metal sheet 2 may be subjected to an embossing process simultaneously with the punching process. The punching process is shown in FIG. 2.

It is evident here that the metal sheet 2 with the polymer film 3 is punched from the side of the metal sheet 2. During the punching process the component to be punched out is pressed in the punch by means of a stamp 5 using a corresponding die 6. During this punching or cutting process the material of the metal sheet 2 is first of all elastically deformed by the penetrating stamp 5. As the stamp 5 penetrates further into the material, the material fibres are extended until the elasticity limit of the material is exceeded so that a plastic deformation occurs. The material is drawn from the outside to the inside to the cutting edge of the stamp 5. In this way drawing-in curvatures are formed on the cut part.

As the stamp 5 penetrates further the shear strength of the material is also exceeded. The material is sheared off on the cutting edge of the die 6 and of the stamp 5 and forms cut surfaces.

The strength of the remaining cross-section of the metal sheet is eventually so low that the material breaks.

During this punching process the polymer film 3 with the pressure-sensitive adhesive 4 is drawn along the cut side edge. Due to the shearing effect, during the punching process the pressure-sensitive adhesive 4 is pressed out beneath the polymer film 3 and sealing of the edge of the polymer film 3 to the metal sheet 2 additionally takes place. By means of the punching process the formation of a new metal surface and the pressing of the pressure-sensitive adhesive 4 take place simultaneously. In this way the pressure-sensitive adhesive 4 is applied ideally. The formation of an amorphous $Al_2O_3$ layer by means of auto passivation, which could have an adverse effect upon adhesion onto the metal sheet 2, is reliably avoided by the simultaneity of the surface formation and the pressing of the pressure-sensitive adhesive 4. A dressing for the removal of the metal oxides, which is normal in conventional methods, is therefore not required.

After the punching process the punching component is subjected to a printing process and is then coated with the layer of hard material in the form of nano paint.

LIST OF REFERENCE NUMBERS 1 punched component
2 metal sheet
3 polymer film
4 pressure-sensitive adhesive
5 stamp
6 die

The invention claimed is:

1. A method for manufacturing a punched component, comprising the steps:
   a) laminating a polymer film onto a surface of a metal sheet, wherein a cold-flowable pressure-sensitive adhesive is provided between the polymer film and the metal sheet; and
   b) punching the laminated metal sheet to produce the punched component, wherein the punching step comprises punching the metal sheet, adhesive, and polymer film, in this order, and comprises use of a stamp and a corresponding die configured with a gap between the stamp and the die so that during punching a portion of the metal sheet is sheared off the laminated sheet and a cut-side edge is formed on the sheared off portion, and wherein a portion of the polymer film and a portion of the cold-flowable pressure-sensitive adhesive are drawn over the cut-side edge during punching.

2. The method according to claim 1, wherein the polymer film comprises or is made of one or more of the following materials:
   polyvinyl chloride
   polyethylene
   polyurethane.

3. The method according to claim 1, further comprising the step of brushing and/or smoothing the surface of the metal sheet before the laminating step.

4. The method according to claim 1, further comprising the step of cleaning the surface of the metal sheet before laminating.

5. The method according to claim 4, wherein the cleaning step involves burning oil and/or fat from the surface.

6. The method according to claim 4, further comprising the step of printing on the cleaned surface.

7. The method according to claim 1, further comprising the step of heating the polymer film after the laminating step and before the punching step.

8. The method according to claim 7, wherein the heating takes place at a temperature of between 60° C. and 120° C. and/or for a period of 10 mins to 240 mins.

9. The method according to claim 1, further comprising the step of embossing the metal sheet before or simultaneously with the punching step.

10. The method according to claim 1, further comprising the step of printing on the polymer film before or after the punching step.

11. The method according to claim 1, wherein after the punching step, the punched component is subjected to deep drawing-type re-shaping, a maximum depth of the re-shaping corresponding to 1 to 10 times the thickness of the metal sheet.

12. The method according to claim 1, wherein the surface of the polymer film facing away from the metal sheet contains a layer of hard material thereon.

13. The method according to claim 2, wherein the polyurethane is a thermoplastic.

14. The method according to claim 5, wherein the burning involves the use of a gaseous fuel comprising silane which decomposes during the burning to form $SiO_2$ particles which are deposited on the surface.

15. The method according to claim 6, wherein the printing step involves applying a conversion layer to the surface.

16. The method according to claim 7, wherein the heating takes place at a temperature of between 80° C. and 100° C. and/or for a period of 20 mins to 60 mins.

17. The method according to claim 1, wherein after the punching step, the punched component is subjected to deep drawing-type re-shaping, a maximum depth of the re-shaping corresponding to 5 to 10 times the thickness of the metal sheet.

18. The method according to claim 12, wherein the hard material comprises a nano paint.

* * * * *